(12) United States Patent
Konno et al.

(10) Patent No.: US 11,736,626 B2
(45) Date of Patent: Aug. 22, 2023

(54) READING DEVICE AND IMAGE FORMING APPARATUS WITH FOREIGN-OBJECT DETECTION BY COMPARING IMAGE FROM READING BACKGROUND WITH IMAGE FROM READING BACKGROUND AND RECORDING MEDIUM

(71) Applicants: Yoshio Konno, Kanagawa (JP); Tatsuya Ishii, Kanagawa (JP); Tohru Matsumoto, Kanagawa (JP); Kohta Aoyagi, Kanagawa (JP); Satoshi Nakayama, Kanagawa (JP); Hideyo Makino, Tokyo (JP); Susumu Mikajiri, Tokyo (JP); Kimiharu Yamazaki, Kanagawa (JP)

(72) Inventors: Yoshio Konno, Kanagawa (JP); Tatsuya Ishii, Kanagawa (JP); Tohru Matsumoto, Kanagawa (JP); Kohta Aoyagi, Kanagawa (JP); Satoshi Nakayama, Kanagawa (JP); Hideyo Makino, Tokyo (JP); Susumu Mikajiri, Tokyo (JP); Kimiharu Yamazaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/825,369

(22) Filed: May 26, 2022

(65) Prior Publication Data
US 2023/0010640 A1    Jan. 12, 2023

(30) Foreign Application Priority Data

Jul. 6, 2021   (JP) ................................ 2021-112423

(51) Int. Cl.
*H04N 1/00*   (2006.01)
*H04N 1/028*  (2006.01)
(Continued)

(52) U.S. Cl.
CPC ..... *H04N 1/00047* (2013.01); *H04N 1/00005* (2013.01); *H04N 1/00013* (2013.01);
(Continued)

(58) Field of Classification Search
None
See application file for complete search history.

(56) References Cited

U.S. PATENT DOCUMENTS 8,085,443 B2 * 12/2011 Kubo ................... H04N 1/4097
358/463
10,404,891 B2 *  9/2019 Ito ....................... H04N 1/00068
(Continued)

FOREIGN PATENT DOCUMENTS

JP   2013-132042   7/2013
JP   2014-155113   8/2014
(Continued)

OTHER PUBLICATIONS

Extended European Search Report dated Dec. 21, 2022 issued in corresponding European Appln. No. 22182993.0.

*Primary Examiner* — Scott A Rogers
(74) *Attorney, Agent, or Firm* — Harness, Dickey & Pierce, P.L.C.

(57) ABSTRACT

A reading device and an image forming apparatus are provided. The reading device includes an image reading device configured to read an image on a recording medium being conveyed, a background device serving as a background image when the image is read by the image reading device, and a foreign-object detector configured to compare a first read image obtained as the background device is read by the image reading device with a second read image obtained as the background device and the recording medium are read by the image reading device to detect an
(Continued)

attached foreign object. The image forming apparatus includes the reading device and an image forming device.

9 Claims, 10 Drawing Sheets

(51) Int. Cl.
  *H04N 1/409* (2006.01)
  *H04N 1/06* (2006.01)
  *H04N 1/12* (2006.01)
(52) U.S. Cl.
  CPC ..... *H04N 1/00037* (2013.01); *H04N 1/00063* (2013.01); *H04N 1/00074* (2013.01); *H04N 1/00084* (2013.01); *H04N 1/00798* (2013.01); *H04N 1/02815* (2013.01); *H04N 1/0692* (2013.01); *H04N 1/124* (2013.01); *H04N 1/4097* (2013.01); *H04N 2201/0446* (2013.01); *H04N 2201/0458* (2013.01)

(56) References Cited

U.S. PATENT DOCUMENTS

| | | | |
|---|---|---|---|
| 10,999,470 B2* | 5/2021 | Misaka | H04N 1/00029 |
| 2012/0008173 A1 | 1/2012 | Konno et al. | |
| 2013/0136315 A1 | 5/2013 | Kawamoto | |
| 2014/0211273 A1 | 7/2014 | Konno et al. | |
| 2015/0163378 A1 | 6/2015 | Konno et al. | |
| 2015/0222790 A1 | 8/2015 | Asaba et al. | |
| 2016/0119495 A1 | 4/2016 | Konno et al. | |
| 2016/0295138 A1 | 10/2016 | Asaba et al. | |
| 2017/0019567 A1 | 1/2017 | Konno et al. | |
| 2017/0257495 A1 | 9/2017 | Kanaya | |
| 2017/0324883 A1 | 11/2017 | Konno et al. | |
| 2019/0327387 A1 | 10/2019 | Hashimoto et al. | |
| 2020/0296243 A1* | 9/2020 | Aoyagi | H04N 1/32448 |
| 2021/0014441 A1 | 1/2021 | Ohmiya et al. | |
| 2021/0080888 A1 | 3/2021 | Ishii et al. | |
| 2021/0168253 A1 | 6/2021 | Nakayama et al. | |
| 2022/0109776 A1 | 4/2022 | Ishii et al. | |
| 2022/0219932 A1* | 7/2022 | Yamazaki | H04N 1/00909 |
| 2022/0263963 A1* | 8/2022 | Aoyagi | H04N 1/00045 |
| 2022/0286576 A1* | 9/2022 | Ishitsuka | G03G 15/5062 |
| 2022/0321708 A1* | 10/2022 | Matsumoto | G06K 15/027 |

FOREIGN PATENT DOCUMENTS

| | | |
|---|---|---|
| JP | 2018-182529 | 11/2018 |
| JP | 2020-088534 | 6/2020 |
| JP | 2021-016110 | 2/2021 |

* cited by examiner

FIG. 6A PSEUDO DEFECT DUE TO ADHESION OF FOREIGN OBJECT FOUND

FIG. 6B ROTATED BACKGROUND IMAGE

FIG. 6C PSEUDO DEFECT DUE TO ADHESION OF FOREIGN OBJECT FOUND

FIG. 6D RESULT IN WHICH ADHESION OF FOREIGN OBJECT IS NOT REFLECTED IN SCANNED IMAGE (AS HIDDEN BY PRINT SHEET)

FIG. 6E PSEUDO DEFECT DUE TO ADHESION OF FOREIGN OBJECT FOUND

READING DEVICE AND IMAGE FORMING APPARATUS WITH FOREIGN-OBJECT DETECTION BY COMPARING IMAGE FROM READING BACKGROUND WITH IMAGE FROM READING BACKGROUND AND RECORDING MEDIUM

CROSS-REFERENCE TO RELATED APPLICATION

This patent application is based on and claims priority pursuant to 35 U.S.C. § 119(a) to Japanese Patent Application No. 2021-112423, filed on Jul. 6, 2021, in the Japan Patent Office, the entire disclosure of which is hereby incorporated by reference herein.

BACKGROUND

Technical Field

Embodiments of the present disclosure relate to a reading device and an image forming apparatus.

Background Art

In the related art, image forming apparatuses are known in which the image formed on a sheet is scanned and whether the image is appropriately formed on the sheet is examined.

Moreover, technologies are known in the art in which shading data is corrected according to the changes in the level of the read data of a reference white board at both ends in the main scanning direction outside the area from which a print image is to be read and obtained. In such related art, the data of a reference white board is obtained in advance from the area from which a print image is to be read and obtained when there is no print image. Further, technologies are known in the art in which the position at which the data is to be obtained is changed by a rotating mechanism when the dirt is observed on the reference white board outside the area from which a print image is to be read and obtained at both ends in the main scanning direction.

However, in the configuration according to the related art, the image inspection is terminated even when a foreign object such as dirt is attached to a position that does not affect the image inspection. Due to such a configuration, unwanted reduction in productivity and the loss of recording media tend to occur.

SUMMARY

Embodiments of the present disclosure described herein provide a reading device and an image forming apparatus. The reading device includes an image reading device configured to read an image on a recording medium being conveyed, a background device serving as a background image when the image is read by the image reading device, and a foreign-object detector configured to compare a first read image obtained as the background device is read by the image reading device with a second read image obtained as the background device and the recording medium are read by the image reading device to detect an attached foreign object. The image forming apparatus includes the reading device and an image forming device.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 4-1 is a first diagram illustrating the read data indicating whether or not a foreign object is present on a background-image rotor, according to an embodiment of the present disclosure.

FIG. 4-2 is a second diagram illustrating the read data indicating whether or not a foreign object is present on a background-image rotor, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

A reading device and an image forming apparatus 100 according to an embodiment of the present disclosure is described below in detail with reference to the accompanying drawings.

First Embodiment

Figure 1:
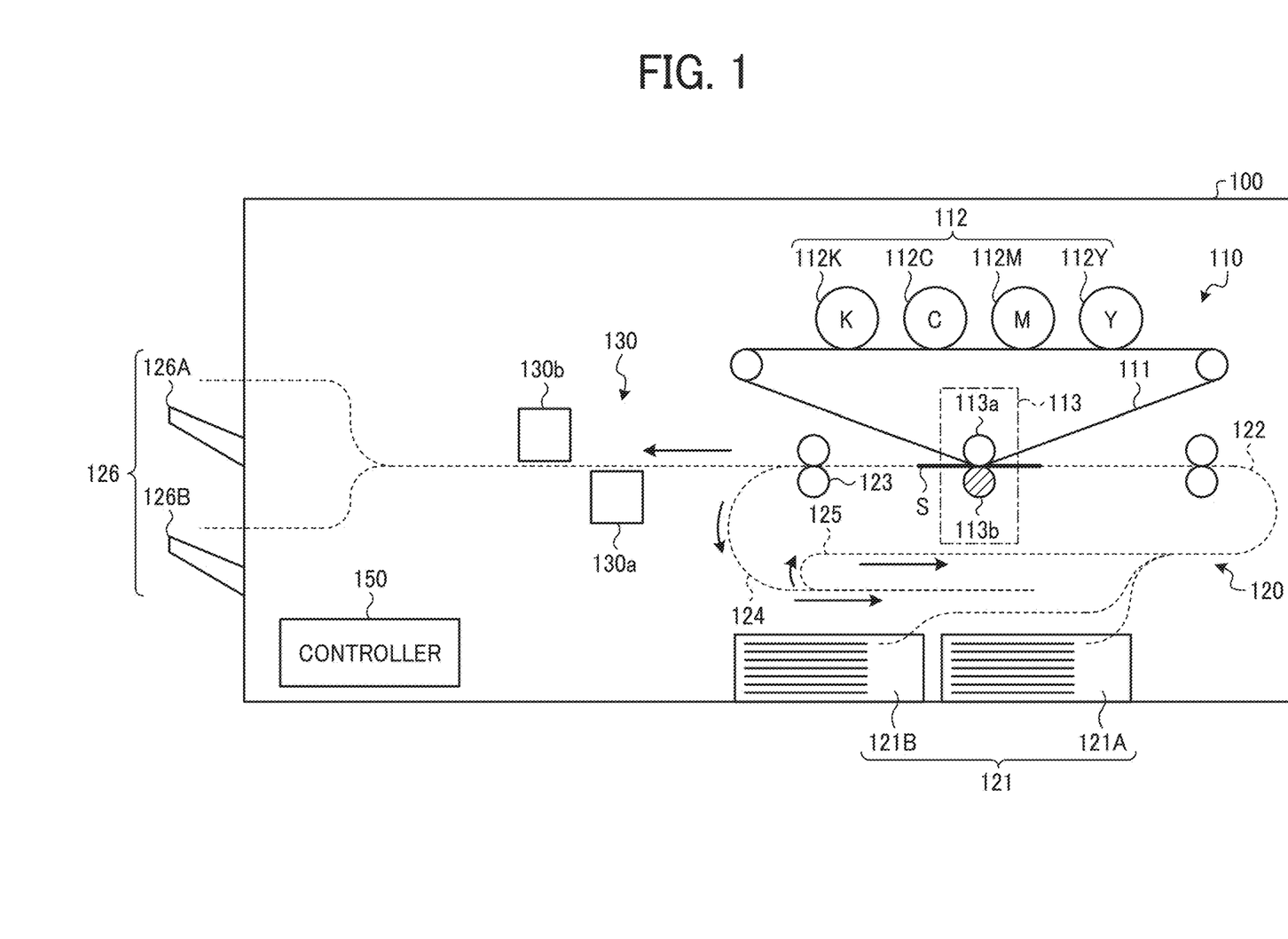
FIG. 1 is a diagram illustrating a configuration or structure of an image forming apparatus according to a first embodiment of the present disclosure.

FIG. 1 is a diagram illustrating a configuration or structure of the image forming apparatus 100 according to a first embodiment of the present disclosure.

As illustrated in FIG. 1, a reading device and the image forming apparatus 100 according to the present embodiment may be applied to a multifunction printer or multifunction peripheral (MFP) that has at least two of a photocopying function, a printing function, a scanning function, and a facsimile (FAX) function. The image forming apparatus 100 is provided with an image forming device 110, a medium conveyance unit 120, an image reading device 130, and a controller 150.

The controller 150 according to the present embodiment controls the overall operation of the image forming apparatus 100, and controls a series of processes to form an image on a sheet S that is a sheet-like recording medium.

The image forming device 110 according to the present embodiment includes a plurality of photoconductor drums 112 used to form a plurality of latent images that correspond to the images of a plurality of colors. The multiple photoconductor drums 112 according to the present embodiment are arranged so as to correspond to the image forming processes in which yellow (Y), magenta (M), cyan (C), and black (K) color toner are used as multicolor image forming materials such as toner.

The multiple photoconductor drums 112 are disposed along an intermediate transfer belt 111 that is a seamless moving unit. The intermediate transfer belt 111 according to the present embodiment is looped around at least one drive roller and a plurality of driven rollers, and moves between a primary transfer position where the toner image developed by the multiple photoconductor drums 112 is transferred and a secondary transfer position where the toner image is transferred to the sheet S.

The transfer device 113 according to the present embodiment is arranged at the secondary transfer position. The transfer device 113 includes a transfer roller 113a and a counter roller 113b disposed to face the transfer roller 113a. In the transfer device 113, the toner image is transferred from the intermediate transfer belt 111 to the sheet S. As a result, the image is formed at a desired position of the sheet S. Between the transfer roller 113a and the counter roller 113b, clearance is given through which the intermediate transfer belt 111 and the sheet S can pass, and the size of such clearance is small enough to hold the intermediate transfer belt 111 and the sheet S. While the sheet S is held and conveyed through the clearance in the direction of conveyance, which is parallel to the sub-scanning direction, the image is transferred to the sheet S.

The medium conveyance unit 120 includes a feed tray 121 that stores the sheet S, a conveyance path 122 in which a path along which the sheet S is conveyed is configured by the arrangement of a plurality of roller pairs, a fixing roller 123 arranged downstream from the transfer device 113 in the direction of conveyance, a conveyance-path switching unit 124, and a reverse path 125.

While the image forming processes are being carried out under the predetermined controlling processes by the controller 150, the sheet S that is stored in the feed tray 121 is conveyed along the conveyance path 122 upon being separated by a pickup roller or the like, and reaches the transfer device 113.

When the sheet S reaches the transfer device 113, the transfer processes are performed. In other words, the sheet S is conveyed in a predetermined direction of conveyance while being held between the counter roller 113b and the front side of the intermediate transfer belt 111 pressed against the counter roller 113b by the transfer roller 113a. When the sheet S passes through the clearance between the intermediate transfer belt 111 and the counter roller 113b, the image forming material on the front side of the intermediate transfer belt 111 is transferred to the sheet S. Through the above transfer processes, an image is formed on one of the two sides of the sheet S. Such one side of the sheet S on which the image is formed may be referred to as the first face in the following description.

The sheet S on the first face of which the image is formed is further conveyed, and after the image is fixed by the fixing roller 123, the sheet S is conveyed to the conveyance-path switching unit 124. Then, the direction of travel of the sheet S is reversed, and the sheet S is conveyed to the reverse path 125. The image that is formed on the intermediate transfer belt 111 is transferred to the second face of the sheet S, and the sheet S is conveyed again to the transfer position of the transfer roller 113a.

The sheet S on the second face of which the image is formed is further conveyed, and after the image on the second face is fixed by the fixing roller 123, the sheet S is conveyed to the image reading device 130.

The image reading device 130 according to the present embodiment includes a first reading device 130a that scans the first face of the sheet S, and a second reading device 130b that scans the second face of the sheet S. The sheet S that has passed through the image reading device 130 is ejected to a tray 126A or a tray 126B of the output tray 126 in a selective manner.

The image reading device 130 according to the present embodiment serves as an image inspection device. More specifically, the image reading device 130 detects, for example, the changes in color tone, the position of the image printed on the sheet S, and an abnormality such as a streak, an omission, and a stain in the printed material that forms an image on the sheet S, and checks the result of detection against the original data to detect a difference equal to or greater than a predetermined value. By so doing, the image reading device 130 according to the present embodiment can detect that an abnormal image has been printed.

The second reading device 130b of the image reading device 130 is described below in detail.

Figure 2:
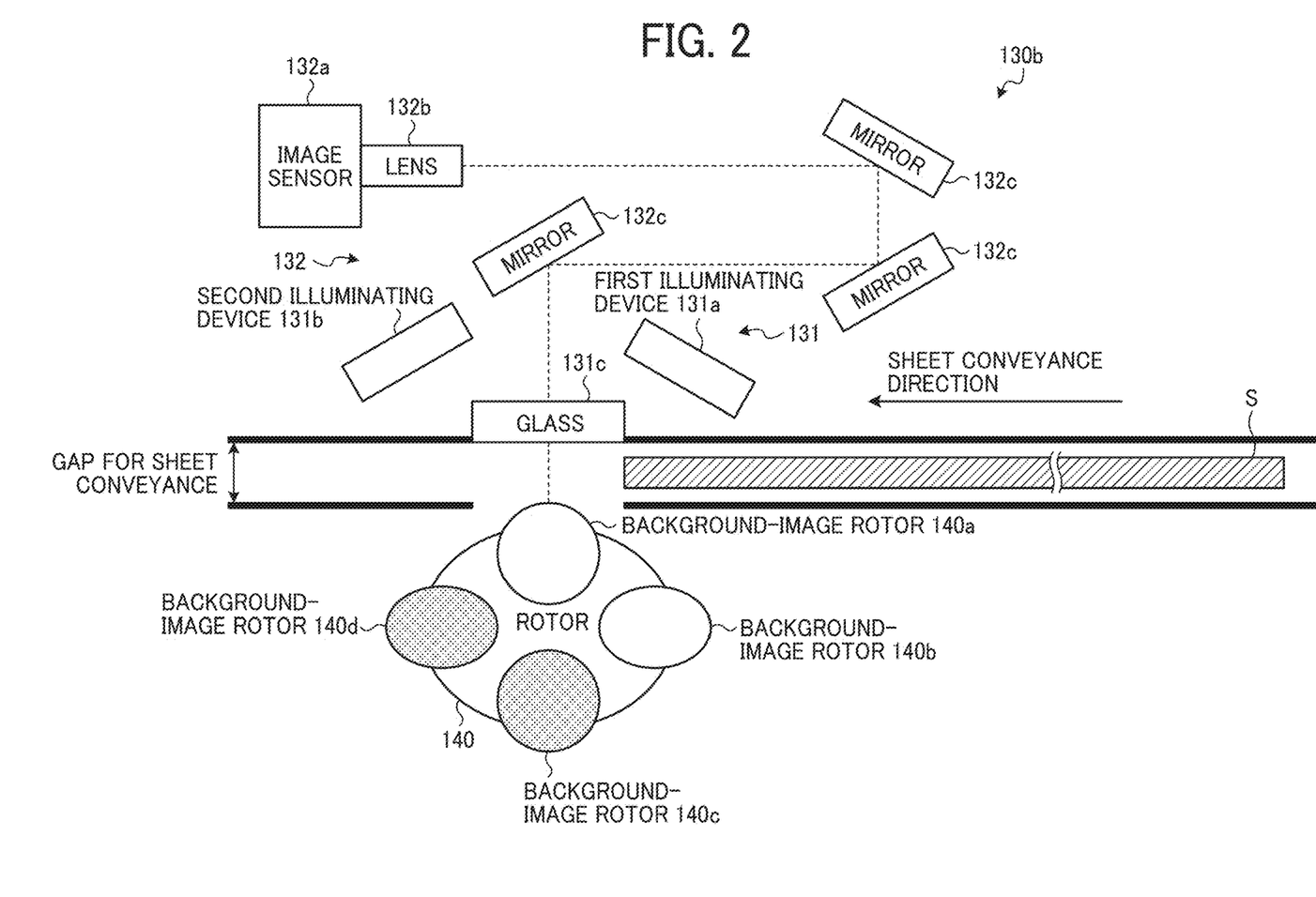
FIG. 2 is a diagram illustrating a configuration or structure of a second reading device of an image reading device, according to an embodiment of the present disclosure.

FIG. 2 is a diagram illustrating a configuration of a second reading device 130b of the image reading device 130, according to the present embodiment.

As illustrated in FIG. 2, the second reading device 130b includes an irradiation unit 131 that irradiates with light the second face of the sheet S that is passing through the scanning position, a reading unit 132, and a background-image switching revolver 140.

The irradiation unit 131 includes a plurality of illuminating devices such as a first illuminating device 131a and a second illuminating device 131b. Each one of the first illuminating device 131a and the second illuminating device 131b is made of an array of a plurality of light-emitting diodes (LEDs). The irradiation unit 131 is provided with a glass 131c arranged at a position facing the background-image switching revolver 140. The glass 131c according to the present embodiment transmits the light emitted from the irradiation unit 131 and the returning light that is emitted from the irradiation unit 131 and reflected by the background-image switching revolver 140 or the sheet S.

The reading unit 132 according to the present embodiment is a reduction optical system provided with an image sensor 132a, a lens 132b, and a plurality of mirrors 132c. The reading unit 132 concentrates the light reflected by the second face of the sheet S using the lens 132b while reflecting the light by the multiple mirrors 132c, and forms an image on a narrow-width image sensor 132a.

The second reading device 130b according to the present embodiment repeatedly performs a reading operation of an image for one line extending in the width direction of the sheet S according to the sheet-passing operation of the sheet S passing through the scanning position. As a result, the image that is printed on the second face of the sheet S can be read as a two-dimensional image.

The background-image switching revolver 140 according to the present embodiment is disposed at a position facing the second reading device 130b with the conveyance path 122 interposed therebetween, and reflects the irradiation light emitted to the second face of the sheet S when the image printed on the second face of the sheet S is to be read.

As illustrated in FIG. 2, the background-image switching revolver 140 according to the present embodiment is provided with a background-image rotor 140a and a background-image rotor 140b each of which rotates and serves as a base white and a background device. The background-image rotor 140a and the background-image rotor 140b are used to obtain a reference level of the read data in the reading unit 132 and the data of base white used to correct the distribution in the main scanning direction. The size in diameter of the background-image rotor 140a is different from the size in diameter of the background-image rotor 140b. As described above, the background-image rotors 140a and the background-image rotors 140b that have different diameters are used to secure a plurality of background images and a stable reading focal length in the image forming apparatus 100 in which a plurality of sheets S having various degrees of thicknesses are conveyed. In the present embodiment, two background-image rotors that serve as base white are arranged. However, no limitation is indicated thereby, and three or more background-image rotors may be arranged.

Moreover, the background-image switching revolver 140 according to the present embodiment are provided with a background-image rotor 140c and a background-image rotor 140d that serve as a background device of colors other than white, in order to distinguish the sheet S from the background image when the printed material printed on the sheet S of various colors is to be detected. The size in diameter of the background-image rotor 140c is different from the size in diameter of the background-image rotor 140d. In the present embodiment, the background-image rotor 140c and the background-image rotor 140d that serve as black background images are illustrated in FIG. 2, but no limitation is indicated thereby.

As described above, the background-image switching revolver 140 according to the present embodiment includes the four types of background-image rotors 140a, 140b, 140c, and 140d. The background-image switching revolver 140 rotates according to the operation mode or the data of the sheet S such as the thickness or color of the sheet S, and can switch the background-image rotors 140a, 140b, 140c, and 140d to an any desired one of the background-image rotors.

In the first reading device 130a, the background-image switching revolver 140 is arranged above the conveyance path 122, and the irradiation unit 131 and the reading unit 132 are arranged below the conveyance path 122.

A hardware configuration of the image reading device 130 is described below with reference to FIG. 3.

Figure 3:
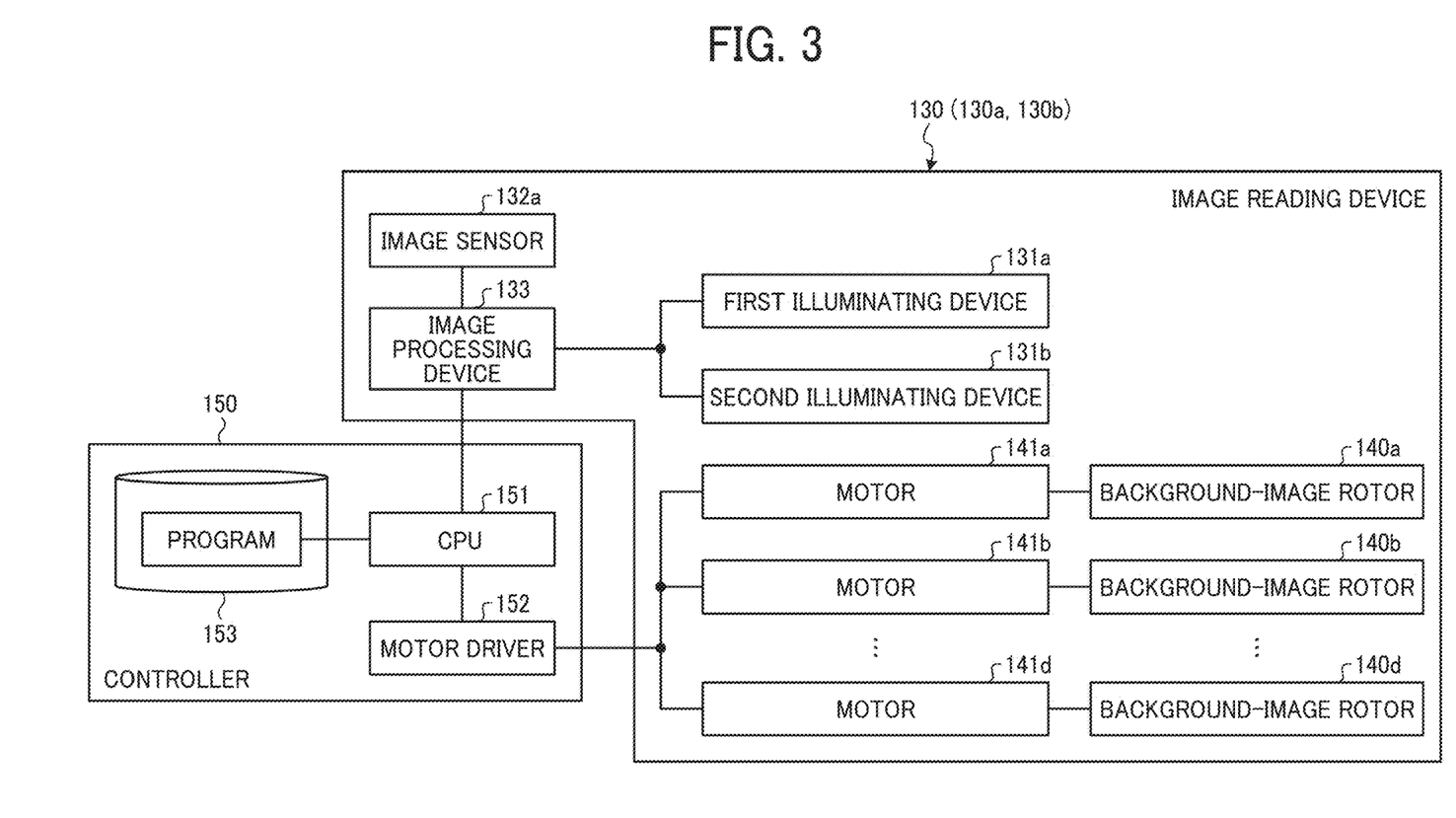
FIG. 3 is a block diagram illustrating a hardware configuration of an image reading device according to an embodiment of the present disclosure.

FIG. 3 is a block diagram illustrating a hardware configuration of the image reading device 130 according to the present embodiment.

As illustrated in FIG. 3, each one of the first reading device 130a and the second reading device 130b of the image reading device 130 includes an image sensor 132a, a pair of illuminating devices 131a and 131b, a plurality of background-image rotors 140a, 140b, 140c, and 140d that drive the multiple motors 141a, 141b, 141c, and 141d of the background-image switching revolver 140 to rotate, an image processing device 133, and a controller 150.

The image processing device 133 according to the present embodiment serves as a foreign-object detector. Such a foreign-object detector detects, for example, the changes in color tone, the position of the image printed on the sheet S, and an abnormality such as a streak, an omission, and a stain in the printed material that forms an image on the sheet S, and checks the result of detection against the original data to detect a difference equal to or greater than a predetermined value. By so doing, the image processing device 133 according to the present embodiment can detect that an abnormal image has been printed. When the image processing device 133 detects that an abnormal image has been printed, the image processing device 133 instructs the controller 150 to stop the printing or display an alert.

The controller 150 according to the present embodiment includes a central processing unit (CPU) 151 that controls the operations of the image sensor 132a, the pair of illuminating devices 131a and 131b, and the multiple motors 141a, 141b, 141c, and 141d, a motor driver 152 that drives the multiple motors 141a, 141b, 141c, and 141d according to an instruction sent from the CPU 151, and a storage unit 153.

The motor driver 152 according to the present embodiment drives each one of the multiple motors 141a, 141b, 141c, and 141d. As the multiple motors 141a, 141b, 141c, and 141d are driven by the motor driver 152, the background-image switching revolver 140 operates.

The storage unit 153 stores a program that indicates, for example, the timing at which the image reading device 130 is to be controlled, and the timing at which the multiple motors 141a, 141b, 141c, and 141d are to be driven. The timing at which the image reading device 130 is to be controlled may be equivalent to, for example, the timing at which an image is to be inspected.

When the image reading device 130 that serves as an image inspection device is incorporated into the image forming apparatus 100, a control unit that triggers the execution of image inspection according to the communication with the CPU 151 and a display unit that triggers the operation of the control unit are additionally arranged. When an abnormality is detected in the results of the detection performed by the image reading device 130, the CPU 151 controls the display unit through the control unit to display the status or give instructions to perform maintenance. The comparison between the original data and the results of image scanning that is performed by the image processing device 133 and the determination made by the image processing device 133 based on the results of comparison may be performed by the above control unit that holds the original data.

Cases are described below in which a foreign object such as paper dust, dirt, toner, ink adheres to a portion of the reading path of the image reading device 130 of the image forming apparatus 100. It is assumed that there are various kinds of sizes, shapes, and colors for the foreign object.

Firstly, cases in which a foreign object adheres to the background-image rotor 140*a* of the background-image switching revolver 140 are described below. When a foreign object adheres to the background-image rotor 140*a* of the background-image switching revolver 140, the originally intended shape of the distribution in the main scanning direction tends to be lost as affected by the foreign object when the data of base white is obtained. In order to handle such a situation, it is necessary to rotate the background-image rotor 140*a* to shift the scanning position. By so doing, desired data can be obtained. However, the background image of the background-image rotor 140*a* is hidden by the sheet S while the sheet S is being scanned. Moreover, when the scanned image is to be inspected, scanning can be performed at a shifted position where no foreign object is present as the background-image rotor 140*a* is rotated. For this reason, it is not always necessary to remove the foreign object by maintenance.

In the related art, the area from which the data of base white is obtained is a limited area at both ends in the main scanning direction, and the distribution in the main scanning direction is generated by estimation. Due to such a configuration, the degree of accuracy is low, and care cannot sufficiently be taken when the area to which a foreign object adhere is not limited to the area from which the data of base white is obtained.

Cases in which a foreign object adheres to the pair of illuminating devices 131*a* and 131*b* making up the irradiation unit 131 or the glass 131*c* of the irradiation unit 131 are described below. If a foreign object adheres to at least one of the pair of illuminating devices 131*a* and 131*b*, or the glass 131*c*, the position of such a foreign object is optically fixed, and thus such a foreign object appears in the read data unintentionally. For this reason, such a foreign object that adheres to at least one of the pair of illuminating devices 131*a* and 131*b* or the glass 131*c* needs to be removed by maintenance.

In order to achieve such functions, in the present embodiment, whether or not maintenance is necessary or unnecessary is determined depending on the adhered portion of the foreign object in the image reading device 130, and the processes of image inspection continue when it is determined that the maintenance is unnecessary. This point of the present embodiment will be described below in detail.

Figure 41:
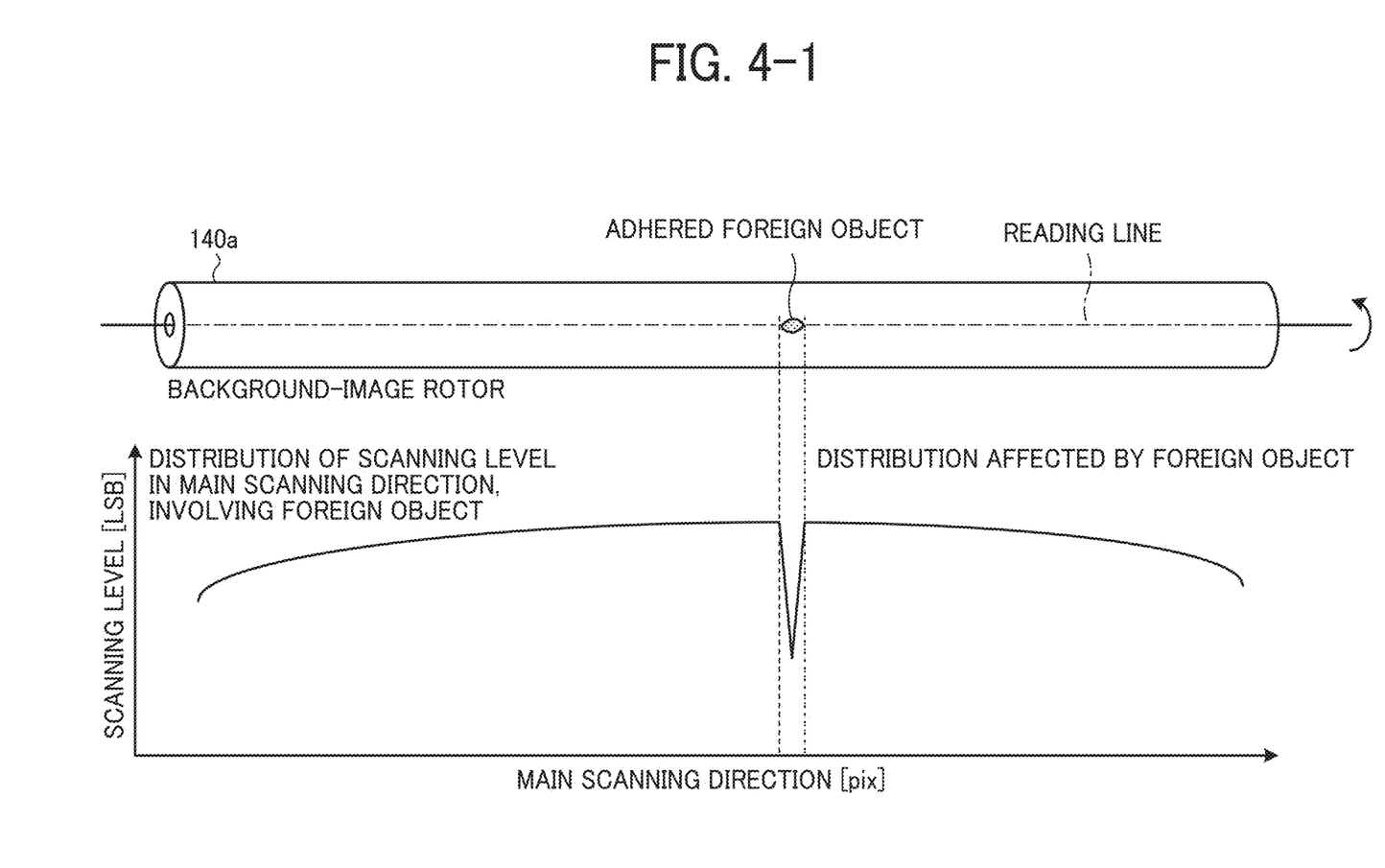
Figure 42:
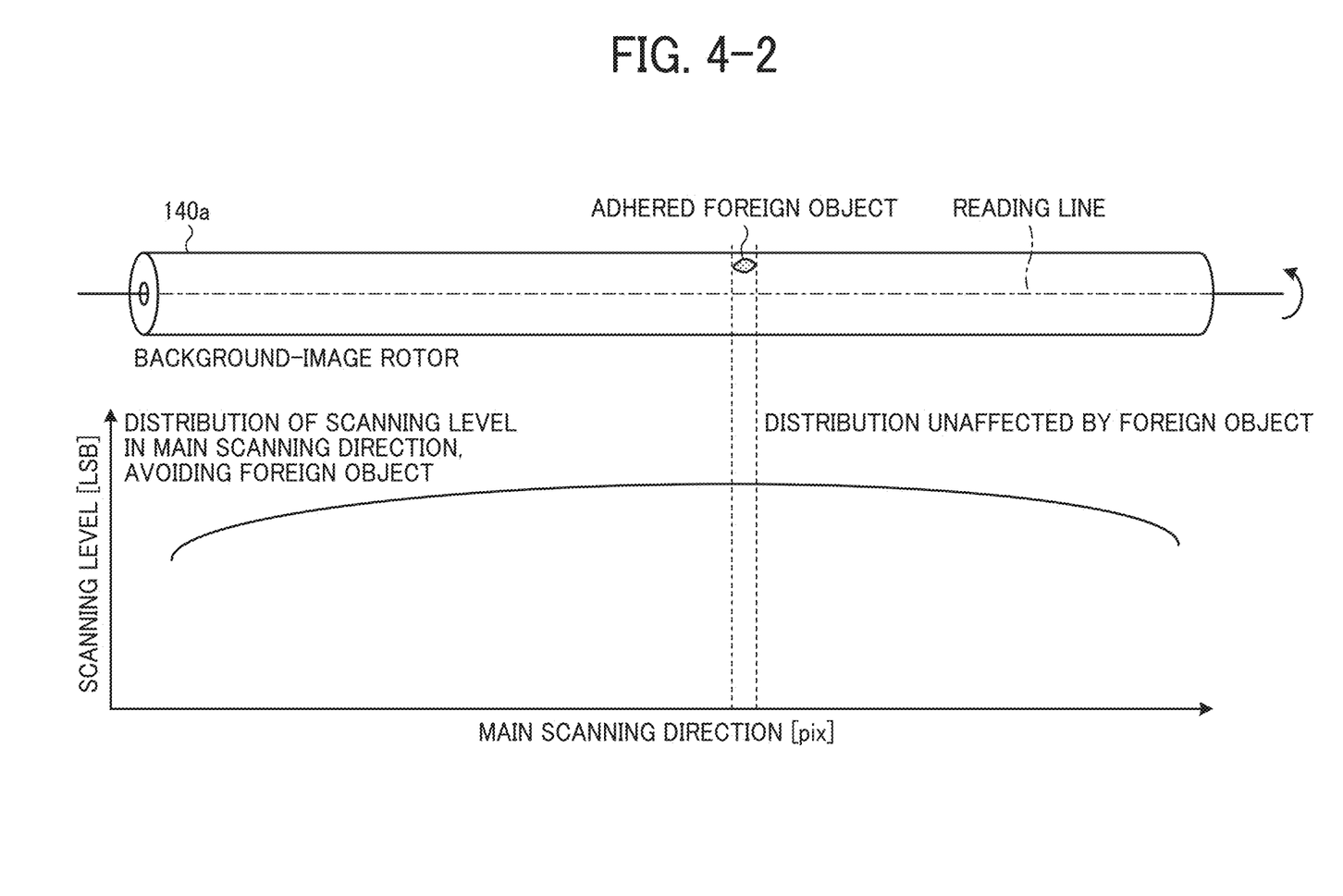

FIG. 4-1 and FIG. 4-2 are diagrams each illustrating the read data indicating whether or not a foreign object is present on the background-image rotor 140*a*, according to the present embodiment.

As illustrated in FIG. 4-1 and FIG. 4-2, the image reading device 130 reads the background-image rotor 140*a* as base-white level data and main-scanning distribution correction data. The image reading device 130 according to the present embodiment scans the background-image rotor 140*a* in advance before the image forming apparatus 100 is initially adjusted or before the sheet S is scanned.

FIG. 4-1 illustrates a picture in which a foreign object adheres to the reading line of the image reading device 130 in the background-image rotor 140*a*. When the reading line including such a foreign object is read, as illustrated in the graph of FIG. 4-1, the scanning level of the foreign object portion changes and cannot be used as correction data of the main scanning distribution. However, by detecting a decrease in the scanning level, it can be figured out that a foreign object has attached or that an optical abnormality is present.

In view of these circumstances, in order to determine whether a foreign object has attached or an optical abnormality is present, as illustrated in FIG. 4-2, the background-image rotor 140*a* is rotated to change the position of the reading line. By changing the position of the reading line, as illustrated in the graph of FIG. 4-2, data with no reduction in the scanning level can be obtained, and it can be determined that the foreign object adheres to the background-image rotor 140*a*. At this time, the image forming apparatus 100 may be stopped and maintenance may be started to remove the foreign object. However, as there is no inconvenience in performing image inspection, the foreign object may be left as it is.

Figure 5:
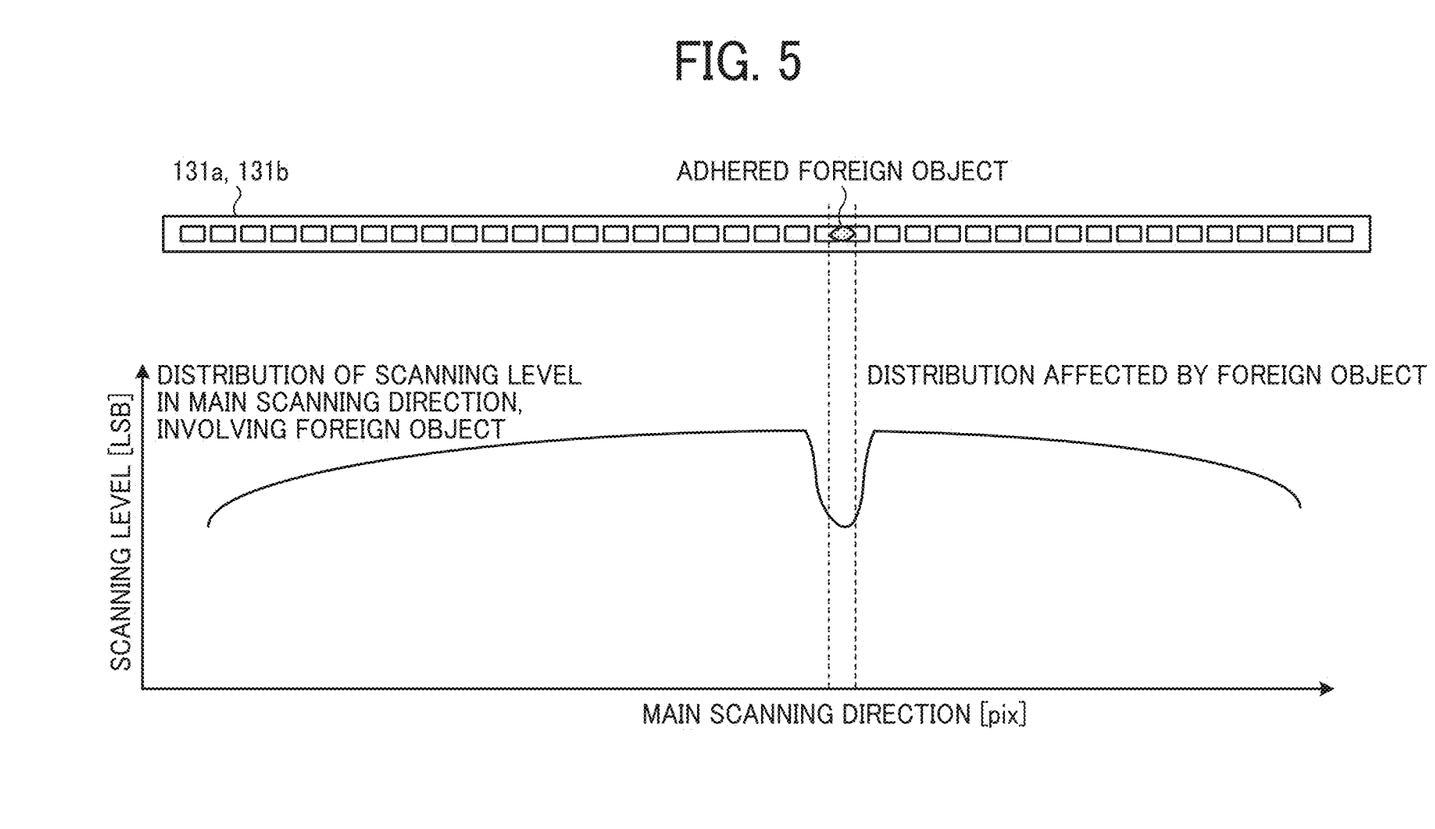
FIG. 5 is a diagram illustrating the read data indicating whether or not any foreign object is present on a pair of illuminating devices, according to an embodiment of the present disclosure.

FIG. 5 is a diagram illustrating the read data indicating whether or not any foreign object is present on the pair of illuminating devices 131*a* and 131*b*, according to the present embodiment.

In the present embodiment described with reference to FIG. 5, a foreign object adheres to the pair of illuminating devices 131*a* and 131*b* that are made of an array of light-emitting diodes (LEDs). As illustrated in FIG. 5, vignetting may occur to the light emitted from the pair of illuminating devices 131*a* and 131*b* due to the foreign object adhering to the pair of illuminating devices 131*a* and 131*b*. In such cases, the radiation intensity of the light that reaches an object becomes insufficient, and the scanning level drops at some of the read data. Unlike the multiple background-image rotors 140*a*, 140*b*, 140*c*, and 140*d* that can rotate, the position of the foreign object on the pair of illuminating devices 131*a* and 131*b* or the glass 131*c* cannot be moved. Due to such configurations as described above, unless the foreign object adhered to the above elements is removed, the read image is affected on a continual basis, and the image forming apparatus 100 cannot function or operate under normal conditions.

How a read image and a foreign object appear according to the present embodiment is described below.

FIG. 6A, FIG. 6B, FIG. 6C, FIG. 6D, and FIG. 6E are diagrams each illustrating how a read image and a foreign object appear, according to the present embodiment.

Figure 6A:
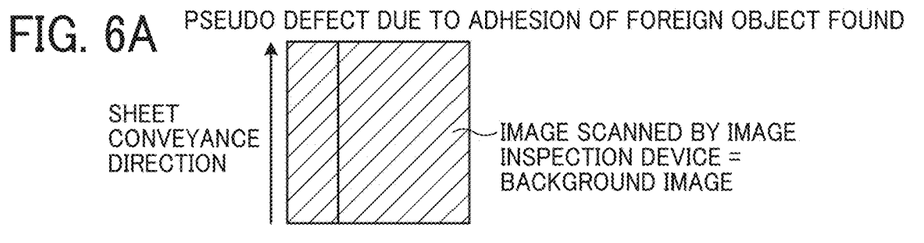
FIG. 6A, FIG. 6B, FIG. 6C, FIG. 6D, and FIG. 6E are diagrams each illustrating how a read image and a foreign object appear, according to an embodiment of the present disclosure.

FIG. 6A illustrates a case in which a foreign object adheres to the background-image rotor 140*a*, and illustrates a first read image of the sheet S that has not passed. In other words, when the background-image rotor 140*a* to which a foreign object adheres is placed in the reading line, the sheet S appears as illustrated in FIG. 6A.

Figure 6B:
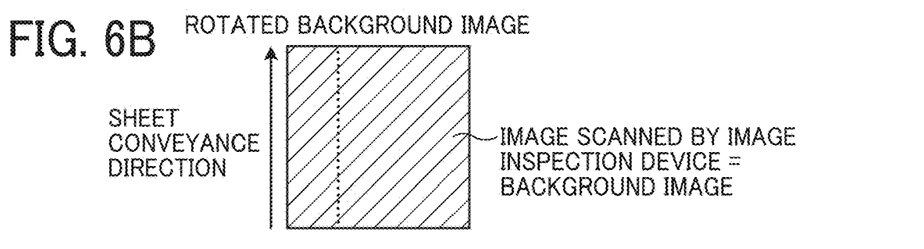

FIG. 6B illustrates the first read image that is scanned and obtained while the background-image rotor 140*a* as illustrated in FIG. 6A to which the foreign object adheres is being rotated. When the data of base white is to be obtained, in order to avoid the foreign object from being caught in the reading line, the background-image rotor 140*a* is rotated to obtain the data of the background image at a position where there is no foreign object.

Figure 6C:
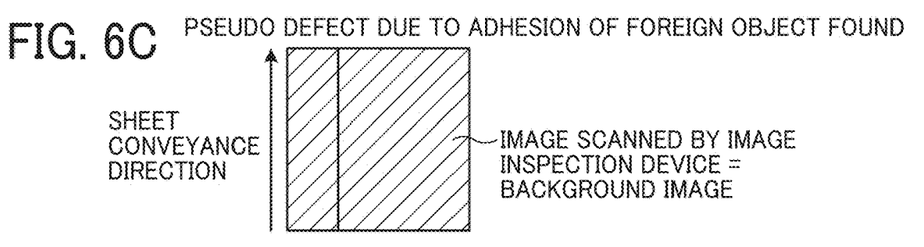

FIG. 6C illustrates a case in which a foreign object adheres to the irradiation unit 131 or the glass 131*c*, and illustrates a first read image of the sheet S that has not passed. The foreign object that is attached to the irradiation unit 131 or the glass 131*c* reflects light. As a result, as illustrated in FIG. 6C, the image is streaked in the sub-scanning direction.

Figure 6D:
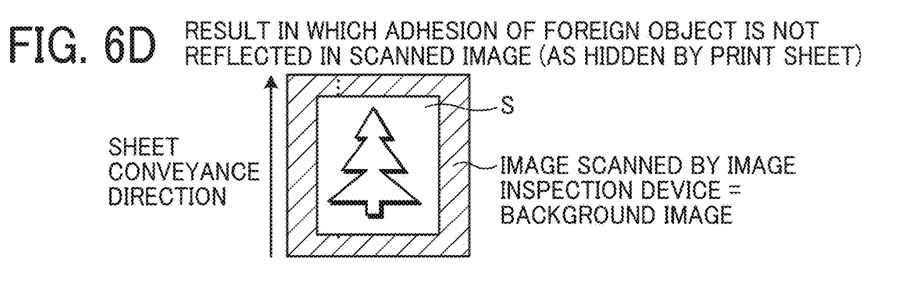

When image inspection is performed under the condition as illustrated in FIG. 6A or FIG. 6B, the foreign object that is attached to the background-image rotor 140*a* is hidden by the sheet S that is an object to be inspected. FIG. 6D illustrates a second read image that is not affected by the foreign object when image inspection is performed.

Figure 6E:
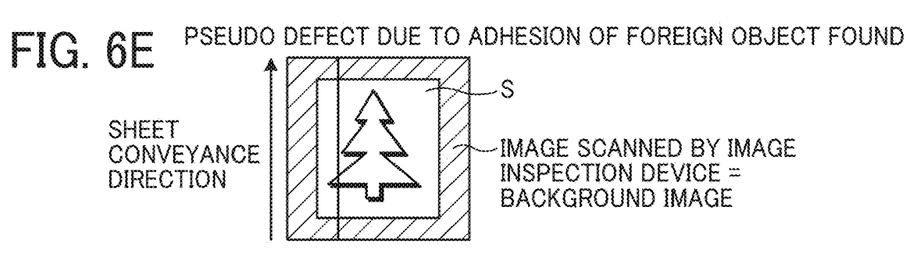

When image inspection is performed under the condition as illustrated in FIG. 6C, the sheet S on which the image has been printed is scanned with the vignetting of light. FIG. 6E illustrates the second read image that contains an unwanted pseudo defect due to the image inspection. Under these conditions, the image inspection cannot effectively be performed.

Figure 7:
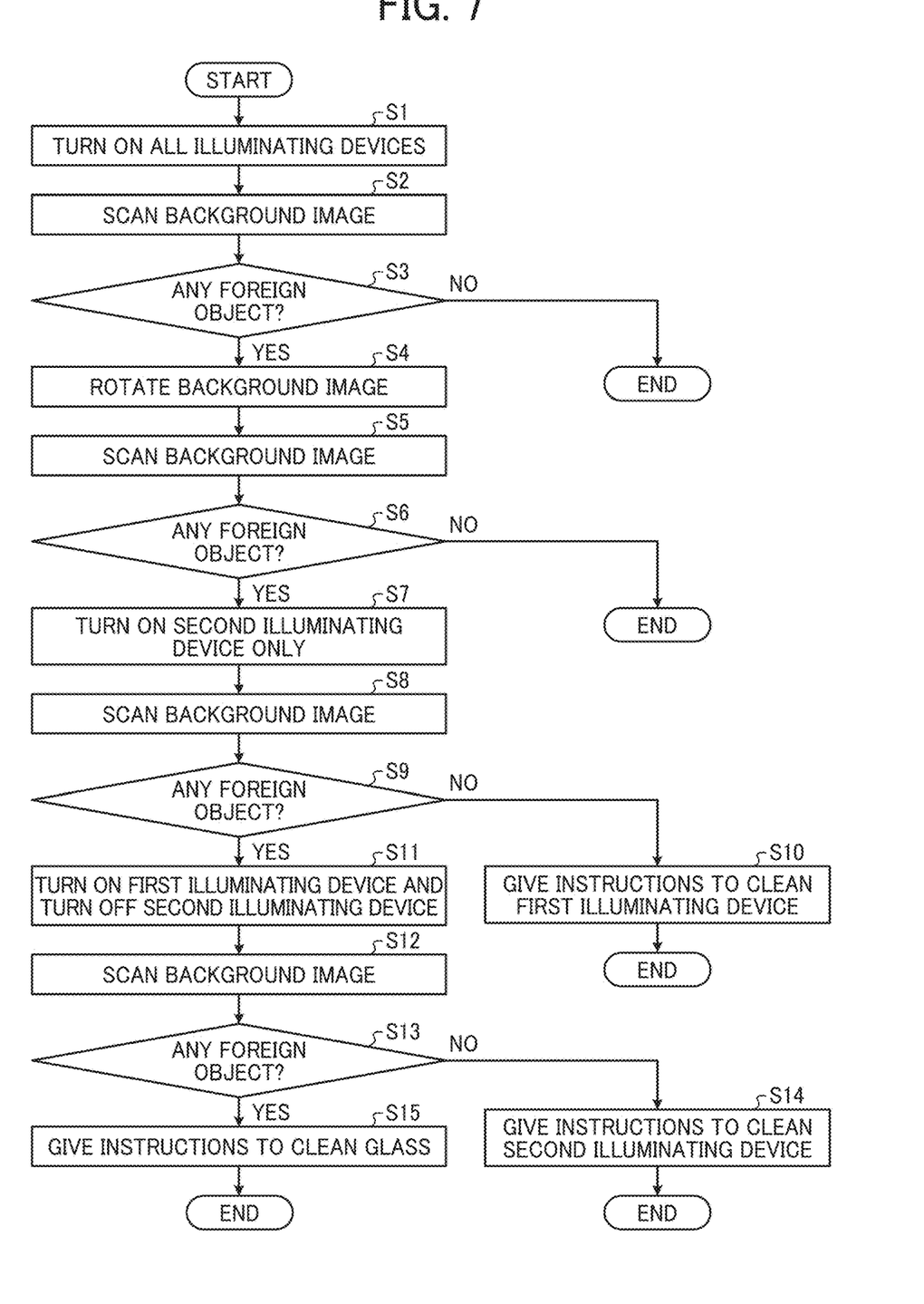
FIG. 7 is a flowchart of the detection processes of a position to which a foreign object adheres, according to an embodiment of the present disclosure.

The processes of detecting the position to which a foreign object adheres are described below.

FIG. 7 is a flowchart of the detection processes of a position to which a foreign object adheres, according to the present embodiment.

As illustrated in FIG. 7, in a step S1, the image processing device 133 turns on all the illuminating devices 131a and 131b of the irradiation unit 131. When there are a plurality of irradiation units 131, the image processing device 133 turns on all of the irradiation units 131. When the irradiation unit 131 is a single unit, the image processing device 133 may send instructions to perform lighting partially.

Subsequently, in a step S2, the image processing device 133 controls the image sensor 132a to read the multiple background-image rotors 140a, 140b, 140c, and 140d.

Subsequently, in a step S3, the image processing device 133 determines whether or not a foreign object is present based on the data obtained from the image sensor 132a. In other words, the image processing device 133 determines whether or not there is a drop in the distribution in the main scanning direction, based on the data obtained from the image sensor 132a.

When it is determined that there is no foreign object ("NO" in the step S3), the image processing device 133 terminates the foreign-object detection processes, and can operate as an image inspection device.

When it is determined that there is a drop in the distribution in the main scanning direction and a foreign object is present ("YES" in the step S3), the image processing device 133 starts narrowing down the adhered portion.

Firstly, in a step S4, the image processing device 133 rotates the multiple background-image rotors 140a, 140b, 140c, and 140d to shift the foreign object from the reading line.

Subsequently, in a step S5, the image processing device 133 controls the image sensor 132a to read the multiple background-image rotors 140a, 140b, 140c, and 140d.

Subsequently, in a step S6, the image processing device 133 determines whether or not a foreign object is present based on the data obtained from the image sensor 132a. In other words, the image processing device 133 determines whether or not there is a drop in the distribution in the main scanning direction, based on the data obtained from the image sensor 132a.

When it is determined that there is no foreign object ("NO" in the step S6), the foreign object adheres to at least one of the multiple background-image rotors 140a, 140b, 140c, and 140d, and the image processing device 133 can operate as the image inspection device in the step S4 to shift the foreign object without any problems. Accordingly, the detection of foreign objects is terminated.

When it is determined that there is a drop in the distribution in the main scanning direction and a foreign object is present ("YES" in the step S6), the image processing device 133 assumes that a foreign object is attached to the optical system such as the glass 131c other than the multiple background-image rotors 140a, 140b, 140c, and 140d, and continues to narrow down the location to prompt the maintenance.

Subsequently, in a step S7, the image processing device 133 turns off one of the illuminating devices 131a and 131b of the irradiation unit 131 that were all turned on. For example, only the illuminating device 131b of the irradiation unit 131 is kept turned on. When the irradiation unit 131 includes only one illuminating device in the system, the image processing device 133 narrows down the area of lighting, and performs irradiation partially.

Subsequently, in a step S8, the image processing device 133 controls the image sensor 132a to read the multiple background-image rotors 140a, 140b, 140c, and 140d.

Subsequently, in a step S9, the image processing device 133 determines whether or not a foreign object is present based on the data obtained from the image sensor 132a. In other words, the image processing device 133 determines whether or not there is a drop in the distribution in the main scanning direction, based on the data obtained from the image sensor 132a. In such cases, the radiation intensity of the illuminating devices of the irradiation unit 131 is reduced. Accordingly, the scanning level in its entirety decreases. The presence or absence of abnormality is determined by the distribution shape.

When it is determined that there is no foreign object ("NO" in the step S9), in a step S10, the image processing device 133 assumes that the foreign object adheres to the illuminating device 131a of the irradiation unit 131 that was turned off at the time of the above determination, and gives instructions to clean the illuminating device 131a. Then, the detection of foreign objects is terminated.

When it is determined that there is a drop in the distribution in the main scanning direction and a foreign object is present ("YES" in the step S9), the image processing device 133 assumes that a foreign object is attached to another optical system such as the glass 131c or the illuminating device 131b of the irradiation unit 131 that is turned on, and further continues the narrowing-down processes.

Subsequently, in a step S11, the image processing device 133 performs switching to turn on the illuminating device 131a of the irradiation unit 131 and turn off the illuminating device 131b of the irradiation unit 131. When the irradiation unit 131 includes only one illuminating device in the system, the image processing device 133 narrows down the area of lighting, and performs irradiation partially.

Subsequently, in a step S12, the image processing device 133 controls the image sensor 132a to read the multiple background-image rotors 140a, 140b, 140c, and 140d.

Subsequently, in a step S13, the image processing device 133 determines whether or not a foreign object is present based on the data obtained from the image sensor 132a. In other words, the image processing device 133 determines whether or not there is a drop in the distribution in the main scanning direction, based on the data obtained from the image sensor 132a.

When it is determined that there is no foreign object ("NO" in the step S13), in a step S14, the image processing device 133 assumes that the foreign object adheres to the illuminating device 131b of the irradiation unit 131 that was turned off at the time of the above determination, and gives instructions to clean the illuminating device 131b. Then, the detection of foreign objects is terminated.

When it is determined that there is a drop in the distribution in the main scanning direction and a foreign object is present ("YES" in the step S13), in a step S15, the image processing device 133 assumes that the foreign object adheres to an optical system such as the glass 131c other than the background-image rotors 140a, 140b, 140c, and 140d, and gives instructions to clean the optical system such as the glass 131c. Then, the detection of foreign objects is terminated.

As described above, in the above embodiments of the present disclosure, the detection of foreign objects is performed and a place to which a foreign object adheres is localized. When it is determined that no maintenance or cleaning is necessary, the image forming apparatus 100 can continuously be used. By contrast, when it is determined that some maintenance or cleaning is necessary, the display unit is controlled to display an alert. Due to such configurations as described above, unwanted reduction in productivity can be prevented or avoided.

As described above, according to the present embodiment, the image processing device 133 determines whether the adhesion of dust is the abnormality that appears in the read image or the adhesion of dust is the abnormality that is hidden in the read image. Due to this configuration, erroneous detection that is caused by a deficiency on the image printed under normal operating conditions can be prevented. Such a deficiency on the printed image is, for example, a foreign object on the image inspection device itself. When it is determined that the attached foreign object affects the image inspection, the image inspection is terminated or instructions for maintenance are given to raise an alert in order to prevent erroneous detection. Due to such a configuration, unwanted reduction in productivity or the loss of recording media can be prevented. What is more, instructions for maintenance can be given upon specifying the site or position to which a foreign object is abnormally attached.

In the present embodiment, the image reading device 130 that scans the sheet S is provided with the reading unit 132 that serves as a reduction optical system. However, no limitation is indicated thereby, a contact image sensor (CIS) may be used as the image reading device 130 that scans the sheet S.

Figure 8:
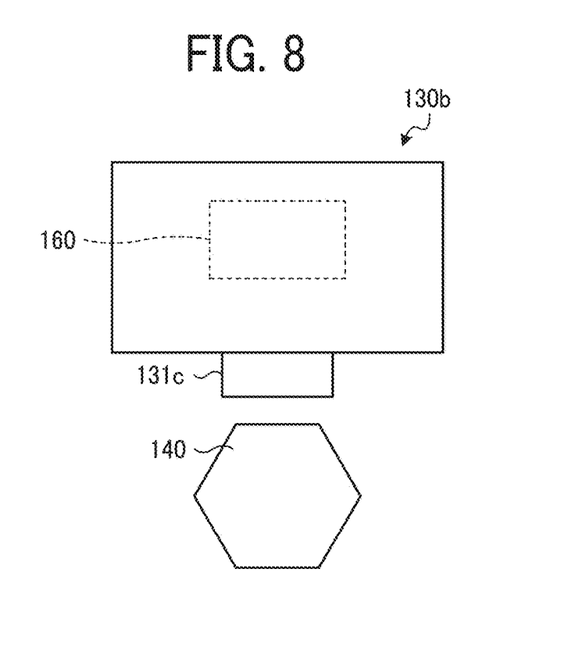
FIG. 8 is a diagram illustrating a configuration or structure of a second reading device according to a modification of the above embodiments of the present disclosure.

FIG. 8 is a diagram illustrating the configuration or structure of the second reading device 130b, according to a modification of the above embodiments of the present disclosure.

As illustrated in FIG. 8, the second reading device 130b includes a line image sensor 160 in which a plurality of imaging elements that perform the photoelectric conversion for each pixel are one-dimensionally arranged in the widthwise direction of the sheet. The imaging device that makes up the line image sensor 160 is an optical sensor that performs a reading operation for the image on the sheet S at the scanning position.

Second Embodiment

A second embodiment of the present disclosure is described below.

The second embodiment of the present disclosure is different from the first embodiment of the present disclosure in that the image processing device 133 is configured to exclude the streak caused by a foreign object that matches the detected foreign object in the main scanning direction from the results of the detection of an adhered foreign object. Note that like reference signs are given to elements similar to those described in the first embodiment, and their detailed description is omitted in the description of the second embodiment of the present disclosure.

Figure 9A:
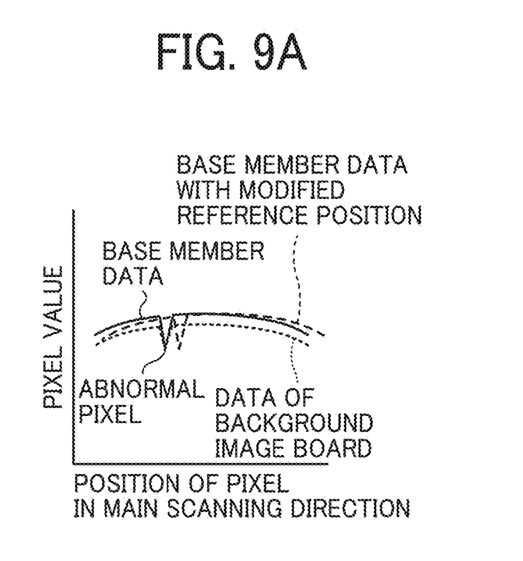
FIG. 9A and FIG. 9B are diagrams each illustrating the inspection of a foreign object while shading is in progress, according to a second embodiment of the present disclosure.
Figure 9B:
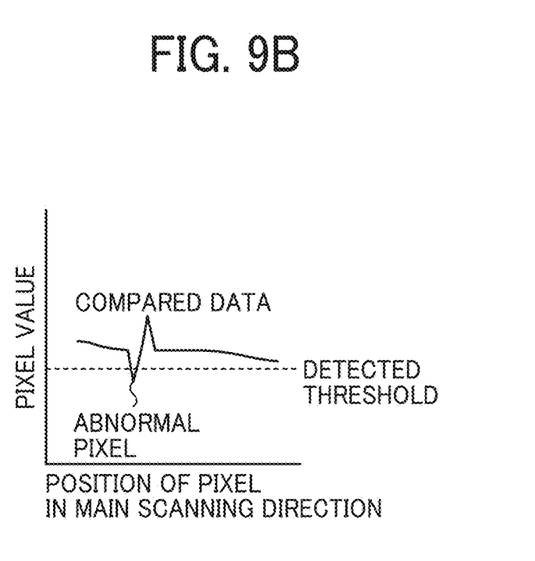

FIG. 9A and FIG. 9B are diagrams each illustrating the inspection of a foreign object while shading is in progress, according to the second embodiment of the present disclosure.

The image reading device 130 according to the present embodiment is provided with a base member that serves as a reference white board. For example, such a base member is used to correct various kinds of distortions in a reading optical system or the like. The image reading device 130 performs shading correction at the time of image reading based on the result of scanning of the reference member. When it is determined that the detected pixel value is abnormal due to, for example, the attachment of a foreign object, as illustrated in FIG. 9A and FIG. 9B, the read data values of the multiple background-image rotors 140a, 140b, 140c, and 140d tend to be smaller than those of the surrounding pixels at the pixel array where abnormalities appear to be present as indicated by the solid line in FIG. 9A and FIG. 9B.

As illustrated in FIG. 9A and FIG. 9B, the read data of the base member gradually changes in the main scanning direction due to the unevenness of radiation intensity of the irradiation unit 131 or the unevenness of sensitivity of the imaging devices of the image sensor 132a. The read data of the base member may be referred to as the second read image or the data of the base member in the following description. In order to handle such a situation, the image processing device 133 according to the present embodiment shifts the reference position of the data of the base member in the main scanning direction as indicated by the long-dashed lines in FIG. 9A and FIG. 9B. As illustrated in FIG. 9, the read data of the multiple background-image rotors 140a, 140b, 140c, and 140d has a distribution in the main scanning direction similar to that of the data of the base member as indicated by short-dashed lines in FIG. 9A and FIG. 9B. The read data of the multiple background-image rotors 140a, 140b, 140c, and 140d may be referred to as the first read image or the data of the background image board in the following description.

As illustrated in FIG. 9A and FIG. 9B, when the data of the base member in which the reference position has been changed is compared with the data of the background image board, a difference of a component that gently changes in the main scanning direction even when no abnormality is present and a difference of a component that steeply changes when an abnormality is present appear. The latter component of a steep change due to an abnormality appears at two positions shifted in the main scanning direction by the shift of the reference position.

The image processing device 133 detects an abnormal pixel in the data obtained by the comparison. The data after the comparison needs to be data corresponding to the data after the shading correction. This is because an abnormal pixel needs to be judged based on an appropriate threshold value and the degree of influence in the data obtained after shading correction. Accordingly, the comparison here is realized by taking the ratio of two data in the same manner as the calculation performed in the shading correction. By performing the calculation of taking this ratio, the component of the pixel value that changes gradually in the main scanning direction is made roughly uniform, such that the pixel value fluctuation in the main scanning direction is minimized, and erroneous detection when performing abnormal pixel detection is prevented. On the other hand, a component that steeply changes due to an abnormality, such as the adhesion of a foreign object, is not uniformized even if the comparison is performed, and thus can be detected as an abnormality.

In the image reading device 130 according to the present embodiment, it is possible to perform highly accurate abnormality detection by these actions. The image processing device 133 performs abnormality detection based on the threshold value in view of the degree of influence on the data after shading correction. Due to such a configuration, the abnormality can be detected with an improved degree of precision.

Figure 10:
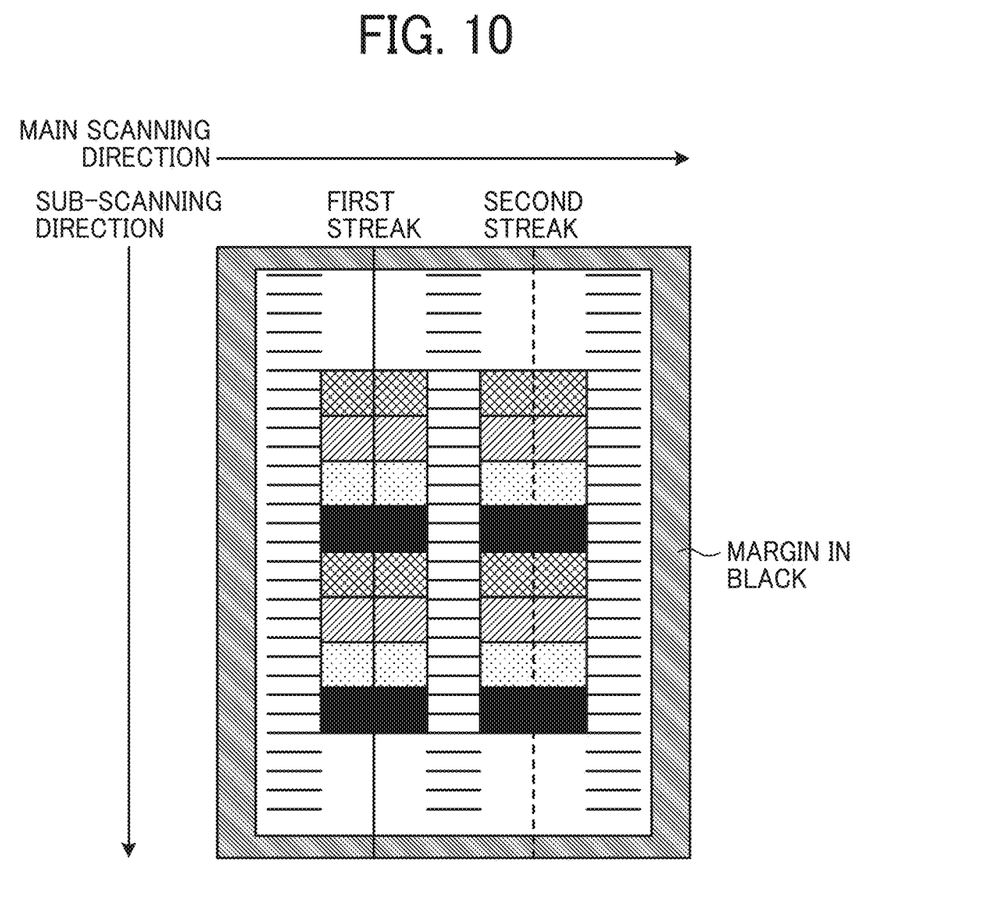
FIG. 10 is a diagram illustrating a result of scanning an image when a foreign object is present, according to an embodiment of the present disclosure.

FIG. 10 is a diagram illustrating a result of scanning an image when a foreign object is present, according to the present embodiment.

As illustrated in FIG. 10, the first streak is the read image when a foreign object is attached to the glass 131c after the shading. The second streak is the read image when a foreign object is present while the shading is in progress.

As described with reference to FIG. 9A and FIG. 9B, the inspection of a foreign object can be performed while the shading is in progress. However, when the foreign object on the multiple background-image rotors 140a, 140b, 140c, 140d or the glass 131c cannot be cleaned, the foreign object appears on the read image as a streak. The image in which a streak is present is notified as an abnormal image.

Accordingly, the streak while shading is in progress and the streak while image inspection is in progress are compared with each other, and the abnormality at the same scanning position in the main scanning direction is excluded from an abnormal image. By doing so, unnecessary detection of an abnormal image due to a foreign object can be reduced.

When the foreign object is attached to the glass 131c after the shading, a streak cannot be detected even if the streak while shading is in progress and the streak while image inspection is in progress are compared with each other. As described above, it can be determined that the object that is attached on the way is a foreign object using a margin in black that is the region outside the sheet P. The streak due to the foreign object is detected continuously in the sub-scanning direction, and is also detected in the margin in black that is the region outside the sheet P. Accordingly, it can be determined that the margin in black at the front and rear ends of the image is abnormal due to a foreign object when a streak is present thereon.

According to the above embodiments of the present disclosure, shading is performed also when the sheet P is passing. Due to such a configuration, the foreign object that is attached to the glass 131c and at least one of the multiple background-image rotors 140a, 140b, 140c, and 140d when the sheet P is passing can also be detected with a high degree of accuracy at a later time as described above with reference to FIG. 9A and FIG. 9B. By performing a comparison with the position that is detected and determined to be abnormal in the main scanning position before the shading, whether or not a streak is present can be determined. When the positions in the main scanning direction match, for example, the display unit is controlled to display a message that the presence of a streak is indicated by the detected abnormality. Due to such a configuration, it is no longer necessary to check a large number of results of the detection of abnormal images.

As described above, according to the above embodiments of the present disclosure, when a foreign object is attached, the read data of the base member whose reference position has been changed is compared with the read data of the multiple background-image rotors 140a, 140b, 140c, and 140d. In other words, the data of the base member is compared with the data of the background image board. By so doing, a difference of component that sharply changes appears, and a foreign object can be detected. As described above, according to the above embodiments of the present disclosure, the abnormality at a position in the main scanning direction where a foreign object is detected as a result of the detection while the shading is in progress is excluded from the abnormal images. By doing so, unnecessary detection of an abnormal image due to a foreign object can be reduced. By comparing the data that is determined to be an abnormal image with the detection of a foreign object while printing is being performed, the influence of the foreign object can be eliminated retroactively.

The program to be executed by the image reading device 130 according to the above embodiments of the present disclosure may be installed for distribution in any desired computer-readable recording medium such as a compact disc, a read-only memory (CD-ROM), a flexible disk (FD), a compact disc-recordable (CD-R), and a digital versatile disk (DVD) in a file format installable or executable by a computer.

A program to be executed by the image reading device 130 according to the above embodiments of the present disclosure may be stored in a computer connected to a network such as the Internet, and may be downloaded through the network. Moreover, such a program that is executed by, for example, the image reading device 130 according to the above embodiments of the present disclosure may be provided or distributed through a network such as the Internet.

Moreover, for distribution, such a program that is executed by the image reading device 130 according to the above embodiments of the present disclosure may be integrated in advance into, for example, a read only memory (ROM).

In the embodiment as described above, the reading device and the image forming apparatus 100 according to an embodiment of the present disclosure are applied to a multifunction printer or multifunction peripheral (MFP) that has at least two of a photocopying function, a printing function, a scanning function, and a facsimile (FAX) function. However, no limitation is indicated thereby, and the reading device and the image forming apparatus 100 according to an embodiment of the present disclosure may be applied to any desired reader or image forming apparatus such as a copier, a printer, a scanner, and a FAX.

The image reading device 130 according to the present embodiment is not limited to a device or apparatus that includes the first reading device 130a that scans the first face of the sheet S and the second reading device 130b that scans the second face of the sheet S. For example, the reading device 130b may be arranged between the fixing roller 123 and the conveyance-path switching unit 124. In such cases, the front and back sides of the sheet S that is read by the reading device 130b are turned, and an image is formed on the sheet S by the image forming device 110. Then, the other side of the sheet S is read by the reading device 130b.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A reading device comprising:
an image reading device configured to read an image on a recording medium being conveyed;
a background device serving as a background image when the image is read by the image reading device; and
a foreign-object detector configured to compare a first read image obtained as the background device is read by the image reading device with a second read image obtained as the background device and the recording medium are read by the image reading device to detect an attached foreign object.

2. The reading device according to claim 1,
wherein the background device is rotatable as driven by a motor, and
wherein the first read image is an image read by the image reading device when the recording medium does not overlap with the background device, while the background device is being rotated.

3. The reading device according to claim 1,
wherein the image reading device includes a plurality of illuminating devices, and is configured to switch the plurality of illuminating devices of the image reading device to turn on or turn off the plurality of illuminating devices of the image reading device when reading the image on the recording medium being conveyed.

4. The reading device according to claim 3,
wherein the image reading device includes a first lighting device and a second lighting device, and is configured to switch on or switch off the first lighting device and the second lighting device.

5. The reading device according to claim 1,
wherein the foreign-object detector is configured to exclude a streak that is caused by a foreign object and matches the detected foreign object in a main scanning direction from a result of detection in which the attached foreign object is detected.

6. The reading device according to claim 5,
wherein the foreign-object detector is configured to detect that the foreign object is attached when an image is formed on the recording medium.

7. The reading device according to claim 5,
wherein the foreign-object detector is configured to provide notification of a result of detection when a position of the detected foreign object matches a previously detected foreign object in the main scanning direction.

8. The reading device according to claim 5
wherein the foreign-object detector is configured to determine whether the foreign object is to be dealt with based on the streak outside a region of the recording medium.

9. An image forming apparatus comprising:
the reading device according to claim 1; and
an image forming device.

* * * * *